United States Patent
Hua et al.

(10) Patent No.: US 8,011,226 B2
(45) Date of Patent: Sep. 6, 2011

(54) LEAKAGE DETECTION METHOD USING MICROMACHINED-THERMAL-CONVECTION ACCELEROMETER

(75) Inventors: Yaping Hua, Jiangsu (CN); Zongya Li, Jiangsu (CN); Hanwu Xiao, Jiangsu (CN)

(73) Assignee: Memsic, Inc., Andover, MA (US)

( * ) Notice: Subject to any disclaimer, the term of this patent is extended or adjusted under 35 U.S.C. 154(b) by 433 days.

(21) Appl. No.: 12/229,646

(22) Filed: Aug. 26, 2008

(65) Prior Publication Data

US 2010/0050747 A1    Mar. 4, 2010

(51) Int. Cl.
*G01M 3/40* (2006.01)
(52) U.S. Cl. ............ 73/40; 73/40.5 R; 73/49.2; 73/52
(58) Field of Classification Search ......... 73/40–49.8, 73/52, 514.05, 514.09, 514.33
See application file for complete search history.

(56) References Cited

U.S. PATENT DOCUMENTS

| | | | | |
|---|---|---|---|---|
| 2,455,394 A * | 12/1948 | Webber | | 338/43 |
| 4,282,744 A * | 8/1981 | Dick | | 73/49.3 |
| 5,245,909 A * | 9/1993 | Corrigan et al. | | 89/41.19 |
| 5,253,510 A * | 10/1993 | Allen et al. | | 73/514.18 |
| 5,581,034 A * | 12/1996 | Dao et al. | | 73/514.09 |
| 5,719,333 A * | 2/1998 | Hosoi et al. | | 73/514.05 |
| 6,182,509 B1 * | 2/2001 | Leung | | 73/514.05 |
| 6,236,366 B1 * | 5/2001 | Yamamoto et al. | | 343/700 MS |
| 6,795,752 B1 * | 9/2004 | Zhao et al. | | 700/299 |
| 6,949,817 B1 * | 9/2005 | Lombard et al. | | 257/686 |
| 7,562,574 B2 * | 7/2009 | Moon et al. | | 73/521 |
| 7,578,188 B2 * | 8/2009 | Kozlov et al. | | 73/514.09 |
| 7,795,723 B2 * | 9/2010 | Chau et al. | | 257/704 |
| 7,862,229 B2 * | 1/2011 | Dribinsky et al. | | 374/137 |
| 2001/0042404 A1 * | 11/2001 | Yazdi et al. | | 73/504.12 |
| 2005/0251294 A1 * | 11/2005 | Cerwin | | 700/279 |
| 2005/0274187 A1 * | 12/2005 | Zhao et al. | | 73/514.16 |
| 2006/0063292 A1 * | 3/2006 | Landsberger | | 438/51 |
| 2006/0179940 A1 * | 8/2006 | Liu et al. | | 73/488 |
| 2006/0283027 A1 * | 12/2006 | Bryan | | 33/203.18 |
| 2008/0087082 A1 * | 4/2008 | Moon et al. | | 73/514.05 |
| 2008/0216571 A1 * | 9/2008 | Kozlov et al. | | 73/514.09 |

* cited by examiner

*Primary Examiner* — David A. Rogers
(74) *Attorney, Agent, or Firm* — Weingarten, Schurgin, Gagnebin & Lebovici LLP

(57) ABSTRACT

A method and device for identifying leaks in or a leakage rate of an integrated circuit package. The method and device include integrating a micromachined-thermal-convection accelerometer in the integrated circuit package and evaluating the initial and subsequent sensitivities of the accelerometer. A change in sensitivity with time provides indicia of a leak and a measure of leakage rate.

16 Claims, 2 Drawing Sheets

LEAKAGE DETECTION METHOD USING MICROMACHINED-THERMAL-CONVECTION ACCELEROMETER

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of detecting leaks from small, enclosed volumes and, more particularly, to means and methods for detecting leaks in an integrated circuit package by sealing a micromachined-thermal-convection accelerometer in the integrated circuit package.

Sealed integrated circuit (IC) packages are routinely inspected or testing for leakage. A common test for fine leaks is the helium mass spectrometer test (MIL-STD-883) by which an IC package is stored for a pre-determined period of time ($t_b$) under a pre-determined positive pressure ($p_w$) of helium (He) gas. If there are any leaks, the positive pressure will force the He gas into the "sealed" IC package. Subsequently, the IC package is placed in a He mass spectrometer. If any He gas were forced into the IC package, it will leak out into the He mass spectrometer absent any positive pressure. The He mass spectrometer can generally detect "fine" leakage rates in a range between $10^{-9}$ and $10^{-5}$ atm-cc/sec.

For "gross" leaks, which by definition are leaks having leakage rates that exceed $10^{-5}$ atm-cc/sec, a "bubble test" is common. In conventional "bubble testing", initially, efforts are made to force a first fluid into any leaks in a "sealed" IC package. Subsequently, the IC package is submerged into a second fluid such as a hot liquid, e.g., fluorocarbon. Leakage from the IC package manifests visually as the first fluid will form gaseous bubbles that out gas from any leaks in the "sealed" IC package.

Alternatively, for "gross" leaks, a residual gas analysis can be performed on the IC package. However, such analyses are destructive and not favored.

Although the above techniques known to the art have their applications, they are unsuitable for testing for leaks or for the leakage rate of an enclosed volume that is smaller than approximately 0.1 cc. Accordingly, it would be desirable to provide means and methods for detecting leaks and/or a leakage rate of an enclosed volume of an IC package that is smaller than approximately 0.1 cc.

BRIEF SUMMARY OF THE INVENTION

The invention provides a method and device for identifying leaks in or a leakage rate of a "sealed" integrated circuit package. The method and device include integrating a micromachined-thermal-convection accelerometer in the integrated circuit package and evaluating the initial and subsequent sensitivities of the accelerometer. The difference in sensitivity with time provides indicia of a leak and a measure of leakage rate.

BRIEF DESCRIPTION OF THE SEVERAL VIEWS OF THE DRAWINGS

The invention will be better understood by reference to the following more detailed description and accompanying drawing in which.

DETAILED DESCRIPTION OF THE INVENTION

Figure 3:
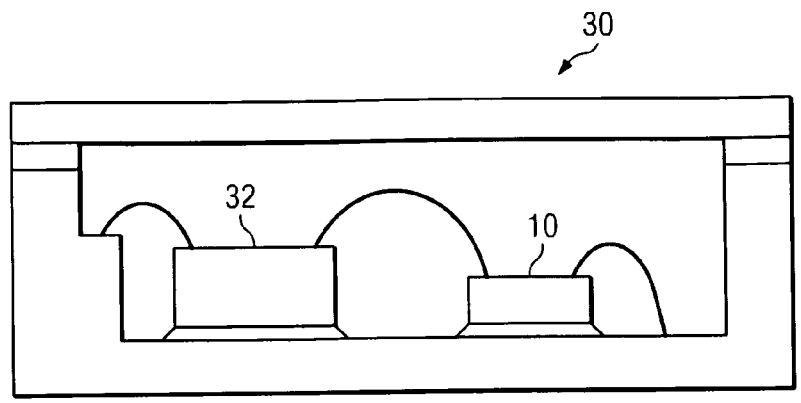
FIG. 3 shows a hermetically sealed integrated circuit package in accordance with the prior art.
Figure 4:
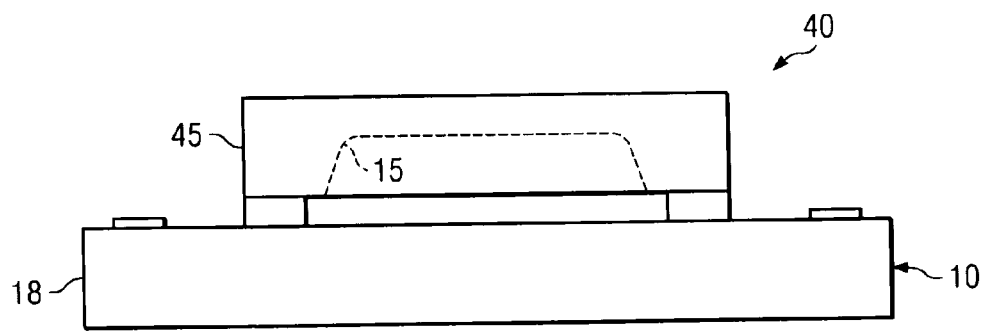
FIG. 4 shows chip scale packaging in accordance with the prior art.

Means and methods of leak detection by integrating a micromachined-thermal-convection accelerometer into a hermetically-sealed, integrated circuit (IC) package are disclosed. Because micromachined-thermal-convection accelerometers are very small and non-intrusive and can be manufactured as small as 1 mm square, they can be integrated with other devices in a hermetical package to great effect, to detect and continuously monitor leaks in a non-vacuum hermetic sealed package. More specifically, the micromachined-thermal-convection accelerometer can be sealed with a cap as a part of the chip scale package (FIG. 4) or included in a small size hermetical IC package (FIG. 3).

Figure 1:
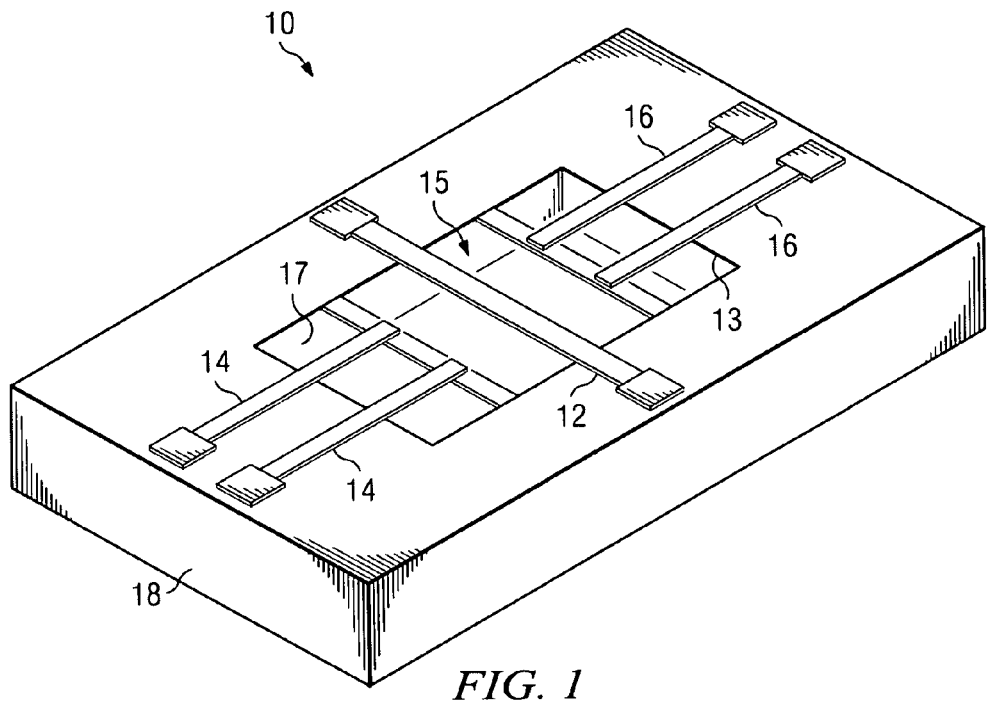
FIG. 1 shows a diagram of a micromachined-thermal-convection accelerometer in accordance with the prior art.

The operating principle of a micromachined-thermal-convective accelerometer 10 will be described. Referring to FIG. 1, the accelerometer 10 includes a central heating device 12 and opposing pairs of temperature sensitive elements 14 and 16 that are disposed on a substrate 18. The temperature sensitive elements 14 and 16 extend symmetrically over a cavity 15 in the substrate 18, at or along two opposing sides 13 and 17. Preferably, the central heating device 12 is disposed between and equidistant from each of the temperature sensitive elements 14 and 16.

The operating principle is based on free-convection heat transfer of a hot air bubble in an enclosed chamber. As the central heating device 12 heats up, the density of the fluid surrounding it in the cavity 15 decreases and a symmetrical temperature gradient in the fluid is produced. The symmetrical temperature gradient extends outwardly from the heating device 12 to each pair of temperature sensitive elements 14 and 16.

As long as the temperature profile produced by the heating device 12 is symmetrical, there is no output from the pair of temperature sensitive elements 14 and 16. This situation is reflected in the solid lines 22 on the temperature profiles 20 shown in FIG. 2, in which the temperature difference ($\sigma T$) between the pair of temperature sensitive elements 14 and 16 is zero or substantially zero.

Figure 2:
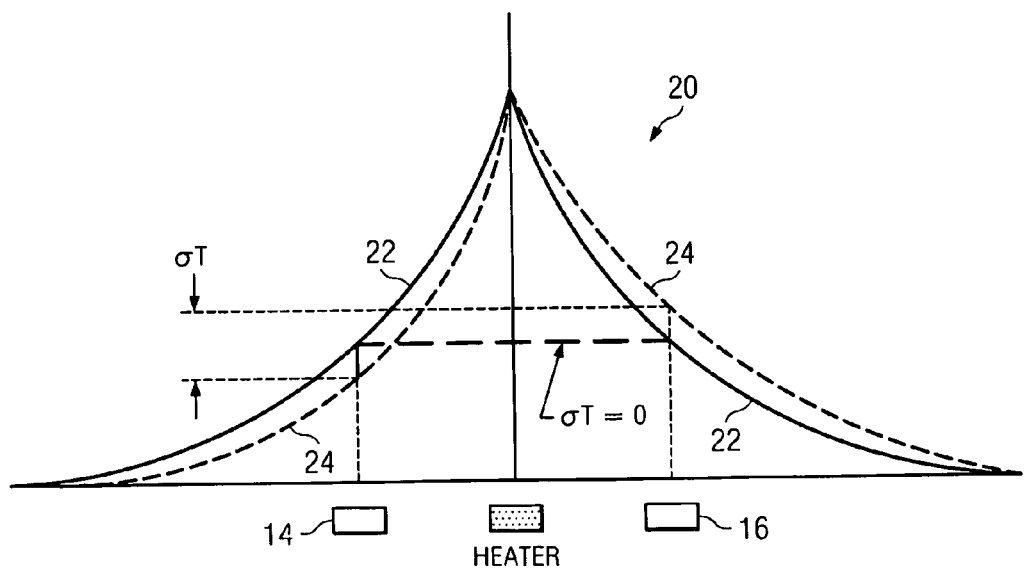
FIG. 2 shows temperature profiles with and without acceleration in accordance with the prior art.

When the accelerometer 10 is accelerated, the symmetry of the temperature gradient is disturbed, which is illustrated by dashed lines 24 in FIG. 2. Indeed, when accelerated, the resulting temperature difference ($\sigma T$) between the pair of temperature sensitive elements 14 and 16, whose positions are fixed, produces an output signal proportional to the applied acceleration.

Instrument sensitivity is one means of leak detection. The absolute output signal of a micro-pressure sensing device, in which offset is included, is proportional to the pressure of the fluid within the sealed package. However, micro-pressure sensing devices, e.g., micro-capacitor pressure sensors, micro-Pirani pressure sensors, micro-resonator pressure sensors, and the like, are affected by offset shift with time. In contrast, with a micromachined-thermal-convection accelerometer 10, the issue is eliminated.

More particularly, using the Earth's gravity is the most convenient way to measure the sensitivity of an accelerometer 10. Sensitivity is understood herein to refer to an output signal produced by the pair of temperature sensitive elements 14 and 16 at one gravity acceleration or "1 g".

Sensitivity can be measured using the Earth's gravity, by changing the orientation of the sensitive axis of the package in which the accelerometer 10 is sealed. For example, if the sensitive axis of the accelerometer 10 is horizontal with respect to the Earth's gravity vector, there is no acceleration applied to the accelerometer 10 and the output signal is offset. If the accelerometer's 10 sensitive axis is rotated vertically to align with the Earth's gravity, output signals for the +1 g and the −1 g cases can be measured.

For example, if the sensitive axis and the Earth's gravity are in the same direction, let the output signal for the +1 g case be T1, in which T1 is the maximum positive magnitude. If the sensitive axis and the Earth's gravity are in opposite directions, let the output signal for the −1 g case be T2, in which T2 is the maximum negative magnitude.

The maximum positive magnitude, T1, is equal to the sensitivity (S) plus the offset (T1=S+offset) while the maximum negative magnitude, T2, is also equal to the offset plus the sensitivity, which has a negative sign (T2=offset+(−S)). Recognizing that sensitivity is the difference between the maximum positive and the maximum negative, $$T1-T2=(\text{offset}+S)-(\text{offset}+(-S)) \text{ or}$$

$$T1-T2=2S.$$

The offsets cancel each other, leaving just the sensitivity (S) Rearranging the above equation, sensitivity is defined by the equation:

$$S=(T1-T2)/2,$$

Figure 5:
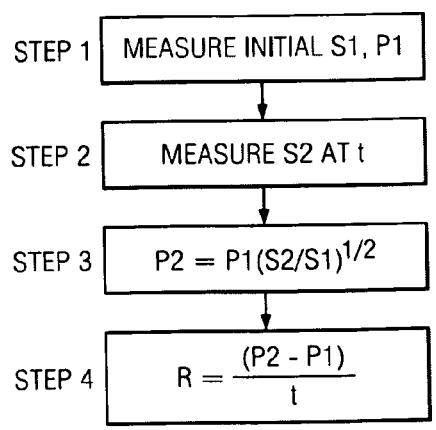
FIG. 5 shows a flow chart of a method of detecting leaks in and the leakage rate of a sealed integrated circuit package.

Knowing this, by measuring the sensitivity of the accelerometer 10 with time, the leakage rate of the package can be determined as shown in the flow chart of FIG. 5 and as described below. First, the initial pressure (P1) of the cavity can be measured and the sensitivity (S1) can be measured when the IC package is first sealed (STEP 1). After a time period (t), the sensitivity (S2) having the same environment temperature with the same heating device power can be measured (S2) (STEP 2).

Subsequently, sensitivity is proportional to pressure squared, the inner pressure (P2) of the package can be calculated (STEP 3) using the equation:

$$P2/P1=(S2/S1)^{1/2} \text{ or}$$

$$P2=P1*(S2/S1)^{1/2}.$$

Finally, the average leak rate can be calculated (STEP 4) using the equation:

$$R=(P2-P1)/t.$$

In short, micromachined-thermal-convection accelerometers 10 can be packaged together with other devices 32 in an IC package 30 (FIG. 3) or can be sealed alone with a cap 45 as a part of a chip scale package 40 (FIG. 4) to detect leaks and leakage rate.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What we claim is:

1. A method for detecting leaks in or a rate of leakage of a hermetically sealed integrated circuit package having a cavity, the method comprising:
   integrating a micromachined-thermal-convection accelerometer in the hermetically sealed package;
   measuring an initial inner pressure (P1) of the cavity;
   measuring an initial sensitivity (S1) of the micromachined-thermal-convection accelerometer in the cavity;
   measuring a second sensitivity (S2) of the micromachined-thermal-convection accelerometer in the cavity at some time (t);
   calculating a second inner pressure (P2) of the cavity at time (t); and
   calculating an average leakage rate (R) using the initial inner pressure (P1), the second inner pressure (P2), and time (t), wherein the average leakage rate (R) is calculated using the equation:

$$R=(P2-P1)/t.$$

2. The method as recited in claim 1, wherein the initial sensitivity (S1) is calculated using the equation:

$$S1=(T1-T2)/2$$

where T1 corresponds to an accelerometer output signal measured at one gravity acceleration (+1 g) and T2 corresponds to an accelerometer output signal measured at one gravity acceleration (−1 g).

3. The method as recited in claim 1, wherein the second sensitivity (S2) is calculated using the equation:

$$S2=(T1-T2)/2$$

where T1 corresponds to an accelerometer output signal measured at one gravity acceleration (+1 g) and T2 corresponds to an accelerometer output signal measured at one gravity acceleration (−1 g).

4. The method as recited in claim 1, wherein the second inner pressure (P2) is calculated using the equation:

$$P2=P1*(S2/S1)^{1/2}.$$

5. The method as recited in claim 1, wherein integrating the micromachined-thermal-convection accelerometer is hermetically sealed package in a chip-scale package.

6. A device for detecting leaks in or a rate of leakage of a hermetically sealed integrated circuit package according to the method recited in claim 1, the device comprising:
   a micromachined-thermal-convection accelerometer in the hermetically sealed package; and
   means for measuring or calculating a sensitivity of the micromachined-thermal-convection accelerometer.

7. The device as recited as claim 6, wherein the means for measuring or calculating is adapted to measure or calculate at least one of the following:
   an initial inner pressure (P1) of the cavity,
   an initial sensitivity (S1) of the micromachined-thermal-convection accelerometer in the cavity,
   a second sensitivity (S2) of the micromachined-thermal-convection accelerometer in the cavity at some time (t),
   a second inner pressure (P2) of the cavity at time (t), and
   an average leakage rate (R) using the initial inner pressure (P1), the second inner pressure (P2), and time (t), wherein the rate of leakage (R) is calculated using the equation:

$$R=(P2-P1)/t.$$

8. The device as recited in claim 7, wherein the initial sensitivity (S1) is calculated using the equation:

$$S1=(T1-T2)/2$$

where T1 corresponds to an accelerometer output signal measured at one gravity acceleration (+1 g) and T2 corresponds to an accelerometer output signal measured at one gravity acceleration (−1 g).

9. The device as recited in claim 7, wherein the second sensitivity (S2) is calculated using the equation:

$$S2=(T1-T2)/2$$

where T1 corresponds to an accelerometer output signal measured at one gravity acceleration (+1 g) and T2 corresponds to an accelerometer output signal measured at one gravity acceleration (−1 g).

10. The device as recited in claim 7, wherein the second inner pressure (P2) is calculated using the equation:

$$P2=P1*(S2/S1)^{1/2}.$$

11. A method for detecting leaks in or a rate of leakage of a hermetically sealed integrated circuit package having a cavity, the method comprising:
   integrating a micromachined-thermal-convection accelerometer in the hermetically sealed package;
   comparing a first sensitivity (S1) of the accelerometer with a second sensitivity (S2) of said accelerometer and calculating a ratio of sensitivity (S2/S1) therefrom; and
   calculating the rate of leakage using an initial inner pressure (P1), a second inner pressure (P2) that is a function of the ratio of sensitivity (S2/S1), and time (t) between the initial and second inner pressures.

12. The method as recited in claim 11, wherein the first sensitivity (S1) is calculated using the equation:

$$S1=(T1-T2)/2$$

where T1 corresponds to an accelerometer output signal measured at one gravity acceleration (+1 g) and T2 corresponds to an accelerometer output signal measured at one gravity acceleration (−1 g).

13. The method as recited in claim 11, wherein the second sensitivity (S2) is calculated using the equation:

$$S2=(T1-T2)/2$$

where T1 corresponds to an accelerometer output signal measured at one gravity acceleration (+1 g) and T2 corresponds to an accelerometer output signal measured at one gravity acceleration (−1 g).

14. The method as recited in claim 11 further comprising:
   measuring a first inner pressure (P1); and
   calculating a second inner pressure (P2) at a time (t) using the equation:

$$P2=P1*(S2/S1)^{1/2}$$

in which S1 and S2 refer the first and second sensitivity, respectively.

15. The method as recited in claim 14 further comprising calculating the rate of leakage (R) using the equation:

$$R=(P2-P1)/t.$$

16. A method for detecting leaks in or a rate of leakage of a hermetically sealed integrated circuit package having a cavity, the method comprising:
   integrating a micromachined-thermal-convection accelerometer in the hermetically sealed package;
   measuring an initial inner pressure (P1) of the cavity;
   measuring an initial sensitivity (S1) of the micromachined-thermal-convection accelerometer in the cavity;
   measuring a second sensitivity (S2) of the micromachined-thermal-convection accelerometer in the cavity at some time (t);
   calculating a second inner pressure (P2) of the cavity at time (t) using the equation:

$$P2=P1*(S2/S1)^{1/2}; \text{ and}$$

calculating an average leakage rate (R) using the initial inner pressure (P1), the second inner pressure (P2), and time (t).

\* \* \* \* \*

UNITED STATES PATENT AND TRADEMARK OFFICE
CERTIFICATE OF CORRECTION

PATENT NO. : 8,011,226 B2  
APPLICATION NO. : 12/229646  
DATED : September 6, 2011  
INVENTOR(S) : Yaping Hua et al.

Page 1 of 1

It is certified that error appears in the above-identified patent and that said Letters Patent is hereby corrected as shown below:

On the Title Page, Item (75) Inventors: reads as follows:

"Yaping Hua, Jiangsu (CN); Zongya Li, Jiangsu (CN); Hanwu Xiao, Jiangsu (CN)" should read as follows:

--Yaping Hua, Wuxi (CN); Zongya Li, Wuxi (CN); Hanwu Xiao, Wuxi, (CN)--.

Signed and Sealed this  
Eighth Day of May, 2012

David J. Kappos  
*Director of the United States Patent and Trademark Office*